United States Patent
Dorum

(10) Patent No.: US 8,676,494 B2
(45) Date of Patent: Mar. 18, 2014

(54) MULTI-DIMENSIONAL ROAD REPRESENTATION

(75) Inventor: Ole Henry Dorum, Chicago, IL (US)

(73) Assignee: Navteq B.V., Veldhoven (NL)

( * ) Notice: Subject to any disclaimer, the term of this patent is extended or adjusted under 35 U.S.C. 154(b) by 138 days.

(21) Appl. No.: 12/893,583

(22) Filed: Sep. 29, 2010

(65) Prior Publication Data

US 2012/0078867 A1     Mar. 29, 2012

(51) Int. Cl.
*G01C 21/34*   (2006.01)
*G06T 15/10*   (2011.01)

(52) U.S. Cl.
USPC ............ 701/410; 701/409; 345/427; 345/442

(58) Field of Classification Search
USPC .......... 701/409, 410, 450, 461, 493; 345/427, 345/442
See application file for complete search history.

(56) References Cited

U.S. PATENT DOCUMENTS

| | | | |
|---|---|---|---|
| 7,084,882 B1 * | 8/2006 | Dorum et al. | 345/589 |
| 7,477,988 B2 | 1/2009 | Dorum | 701/208 |
| 7,987,186 B1 * | 7/2011 | Joshi | 707/736 |
| 2007/0288158 A1 * | 12/2007 | Dorum | 701/207 |
| 2010/0082248 A1 * | 4/2010 | Dorum et al. | 701/209 |
| 2010/0082307 A1 * | 4/2010 | Dorum et al. | 703/2 |
| 2010/0082564 A1 * | 4/2010 | Fernekes | 707/705 |
| 2010/0235405 A1 * | 9/2010 | Morris | 707/803 |

OTHER PUBLICATIONS

Definitions; dictionary.com; http://dictionary.com/browse/vector, http://dictionary.com/browse/array, http://dictionary.com/browse/index.*

* cited by examiner

*Primary Examiner* — Tuan C. To
*Assistant Examiner* — Aaron L Troost
(74) *Attorney, Agent, or Firm* — Lempia Summerfield Katz LLC

(57) ABSTRACT

A method and system for representing multiple road properties with a single multi-dimensional parametric spline curve is disclosed. A B-Spline is generated to represent a first road dimension. The B-Spline is written mathematically in vector format. One or more road dimensions to be added to the B-Spline are selected. Depending on the selection, the road dimensions are created in a format compatible with the B-Spline. For example, the road dimensions may be created using curve fitting, B-Spline merger, or direct assignment. Once the road dimensions are created, they are added to the original B-Spline vector. The new B-Spline vector is then stored in a data storage unit for use by systems, such as Advanced Driver Assistance Systems.

21 Claims, 8 Drawing Sheets

MULTI-DIMENSIONAL ROAD REPRESENTATION

FIELD

The present invention relates generally to a digital representation of roads, and more particularly, relates to a multi-dimensional road representation that allows for a single road spline to encode multiple discrete and analytical road properties.

BACKGROUND

Advanced Driver Assistance Systems (ADAS) were developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic, and vision-oriented sensors, such as digital video cameras and LIDAR.

Some advanced driver assistance systems also use digital map data. These systems are sometimes referred to as map-enhanced ADAS. The digital map data can be used in advanced driver assistance systems to provide information about the road network, road geometry, road conditions, and other items associated with the road and terrain around the vehicle. Unlike some sensors, the digital map data is not affected by environmental conditions, such as fog, rain, or snow. In addition, the digital map data can provide useful information that cannot reliably be provided by sensors, such as curvature, grade, bank, speed limits that are not indicated by signage, lane restrictions, and so on. Further, digital map data can provide a predictive capability well beyond the range of sensors or even beyond the driver's vision to determine the road ahead of the vehicle, around corners, over hills, or beyond obstructions. Accordingly, the digital map data can be a useful addition for some advanced driver assistance systems.

The map-enhanced advanced driver assistance systems commonly use data from a geographic database associated with a navigation system in a vehicle. The navigation system database contains data that represents the road network in the region, such as the locations (geographic coordinates, including altitude) of roads and intersections, road names, speed limits along roads, turn restrictions at intersections, addresses or address ranges along roads, the number of lanes for each road, lane width, lane markings, functional classes of roads, the locations of medians, and so on. The navigation system database may also contain information about other geographic features, such as bodies of water, parks, administrative areas (including municipal, state, and country boundaries), and locations of points of interest, such as businesses, hospitals, police stations, and so on.

In some geographic databases, each road is represented as one or more discrete road segments, each of which is represented by a separate data entity. A representation of a road segment includes, among other things, information about its location (i.e., latitude, longitude, and possibly altitude) and shape. If a road segment is straight, it can be represented by identifying its endpoints. However, if a road is other-than-straight, additional information is required to indicate the shape of the road.

One way to represent the shape of a curved road segment, is to use shape points. Shape points are points through which a road segment passes between its end points. By providing the coordinates of one or more shape points, the shape of a curved road segment can be represented.

There are other ways of representing other-than-straight linearly extending features. For example, linearly extending features may be represented using mathematical expressions, such as splines. The use of mathematical expressions may provide for a smooth and possibly more realistic way to represent linearly extending geographic features.

Although use of mathematical expressions provides advantages, there is still room for improvement. For example, when modeling road geometry it may not be possible to model all aspects of the road with a single curve. For example, with road center geometry and lane paint stripe geometry it may not possible to satisfy both geometry position constraints and curvature constraints simultaneously with a single curve. Road center geometry needs to be smooth to represent fair curvature and, therefore, sacrifices precision to maintain curvature and heading smoothness. On the other hand, lane paint stripe geometry has very high precision and, therefore, has noisy curvature. The same holds true for 3D road height and slope.

U.S. Pat. No. 7,477,988, assigned to the same assignee as the current application and hereby incorporated by reference, describes a dual road geometry representation that supports ADAS. One road geometry data representation indicates the road position, e.g., road centerline or lane centerline, and the other road geometry data representation indicates the road shape, e.g., curvature and/or heading. However, it would be beneficial to have a single curve representation to simplify the road data model.

SUMMARY

A method and system for representing multiple aspects road properties with a single multi-dimensional parametric spline curve is disclosed. The following is a list of examples of types of geometry that can be represented by a single multi-dimensional spline curve:

Road center geometry+lane paint stripe geometry;
Road center geometry+road center curvature;
Lane paint stripe geometry+road center curvature;
Road center geometry+elevation+slope+curvature+banking angle+road width; and
Lane center geometry+lane elevation+lane slope+lane curvature+lane banking angle.

A B-Spline is generated to represent a road feature, such as road center geometry. The B-Spline is characterized mathematically in vector form. One or more dimensions to be added to the B-Spline are selected and, depending on the selection, the dimensions are created in a format compatible with the B-Spline. For example, the dimensions may be created using curve fitting, B-Spline merger, or direct assignment. Creating a new dimension may also change the knot vector. Once the dimensions are created, they are added to the original B-Spline control point vector. The new B-Spline control point vector is then stored in a data storage unit.

As a result, multiple road properties can be represented with a single curve representation. This concise representation can be effectively compressed using lossless wavelet compression techniques, further reducing the amount of data needed to represent road properties. Moreover, a system with access to the stored B-Spline vector can obtain all of the encoded road properties (e.g., position, heading, curvature, slope, banking angle, and so on) in a single operation for any point along the road.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

A spline refers to any composite curve formed with piecewise polynomial functions representing curve sections and satisfying specified conditions at boundaries of the sections. Thus, there are many types of spline curves, including B-Splines. Splines are well-known in the art.

A B-spline has control points and knots. A control point is a physical point that lies on or close to an actual point along the represented geographic feature. A set of control points mathematically describes the spline. Thus, the control points dictate the shape of a spline. The knots are the points at which individual polynomial curve segments of a polynomial spline curve join together. The segments are joined in such a way as to provide smoothness of the complete curve. A knot vector is an ordered list of non-decreasing floating point numbers that describe points along the spline curve where segments begin and end.

With splines, map features, including curving road portions, are represented by polynomial equations whose coefficients have been determined so as to generate curves that match the shapes of the geographic features with the desired degree of accuracy. Thus, splines are a means of describing the shape of the underlying road geometry by specifying the coefficients of a polynomial equation. As described in U.S. Pat. No. 7,084,882, splines have been used to represent shapes of road segments in navigation system databases. U.S. Pat. No. 7,084,882 is assigned to the same assignee as the current application and is hereby incorporated by reference.

Figure 1:
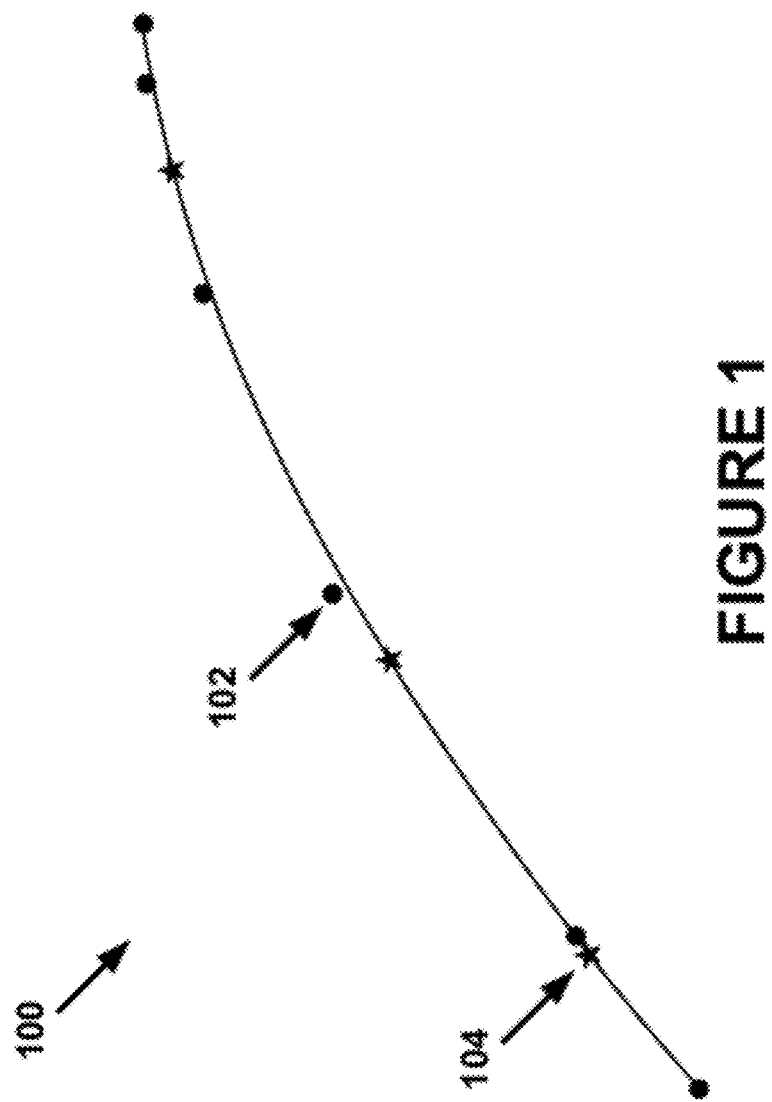
FIG. 1 depicts a non-uniform, non-rational, cubic B-Spline, according to an example.

FIG. 1 depicts a single non-uniform, non-rational, cubic B-Spline 100 with its control points 102 (circles) and internal knots 104 (stars). For the 2D B-Spline 100 depicted in FIG. 1, the control points 102 are 2D points and the knot vector is a non-decreasing number of floating precision numbers. The knots $t_i$ relate the parametric u-value of the B-Spline to the control points $c_i$ and determine the joint locations between the individual cubic curve segments of the spline. Points on a B-Spline are computed as follows:

$$p(u) = \sum_{i=0}^{n} c_i N_{i,k}(u) \quad \text{(Equation 1)}$$

where the $N_{i,k}(u)$ are the blending functions that are defined recursively as a function of $\{t, u, k\}$, where k is the curve order.

Each vector component of the B-Spline is computed separately as a function of u since p(u) and $c_i$ are vectors. Thus, the components of the spline are computed as:

$$x(u) = \sum_{i=0}^{n} c_{i_x} N_{i,k}(u) \quad \text{(Equation 2)}$$

$$y(u) = \sum_{i=0}^{n} c_{i_y} N_{i,k}(u)$$

which can be written in explicit vector format:

$$p(u) = \begin{bmatrix} x(u) \\ y(u) \end{bmatrix} = \sum_{i=0}^{n} \begin{bmatrix} c_x \\ c_y \end{bmatrix}_i N_{i,k}(u). \quad \text{(Equation 3)}$$

This vector representation allows a single road spline to encode multiple discrete and analytical ADAS road properties, such as road center, lane geometry shape, road width, lane width, parallel lane groups, curvature, slope, height, and banking angle. For example, elevation (z) can be added as follows:

$$p(u) = \begin{bmatrix} x(u) \\ y(u) \\ z(u) \end{bmatrix} = \sum_{i=0}^{n} \begin{bmatrix} c_x \\ c_y \\ c_z \end{bmatrix}_i N_{i,k}(u). \quad \text{(Equation 4)}$$

As another example, banking angle $\phi(u)$ can be added as follows:

$$p(u) = \begin{bmatrix} x(u) \\ y(u) \\ z(u) \\ \varphi(u) \end{bmatrix} = \sum_{i=0}^{n} \begin{bmatrix} c_x \\ c_y \\ c_z \\ c_\varphi \end{bmatrix}_i N_{i,k}(u). \quad \text{(Equation 5)}$$

Even discrete values (i.e., step functions) may be added to the data model, which allows encoding discrete road properties, such as the number of lanes, speed limit, and so on as a function of the parametric distance of the road. As a result, this vector representation eliminates the need of having multiple curve representations associated with a road segment.

However, before road properties can be added to the vector representation, the dimensions of the road property need to be compatible with the B-Spline. Thus, depending on the type of the road property, the dimensions of the property need to be generated in a compatible manner. The dimensions to be added to a B-Spline may be created in at least three ways: curve fitting, merging B-Splines, and direct assignment of control point values as described as follows. Other methods are also possible.

Figure 2:
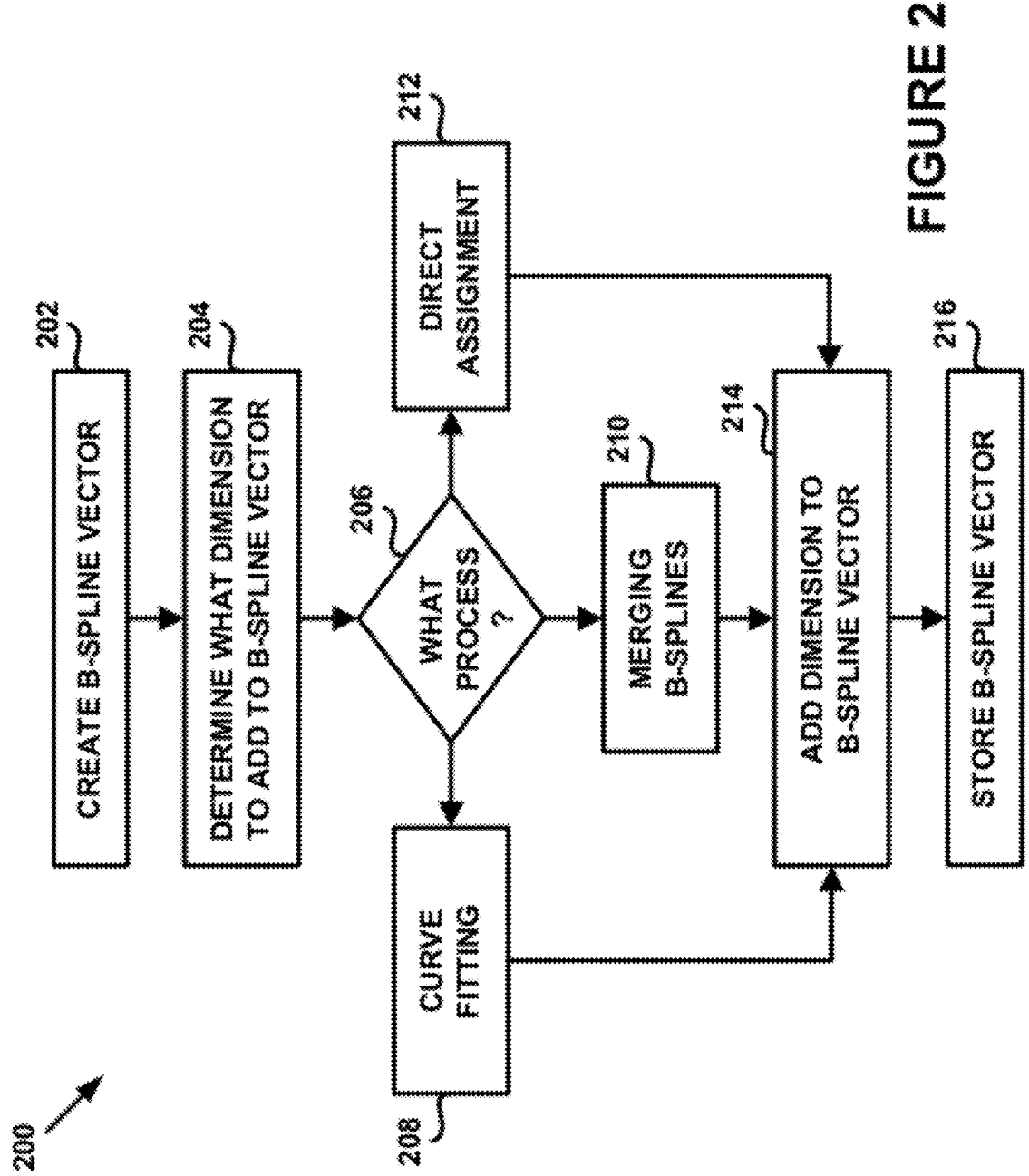
FIG. 2 is a flow chart of a method of representing multiple road properties with a single B-Spline curve, according to an example.

FIG. 2 is a flow chart of a method 200 of representing multiple road properties with a single B-Spline curve. At block 202, the method 200 creates a B-Spline having a vector representation. The method 200 starts by creating a B-Spline representing a single feature of a road. The B-Spline may represent the 2D road center geometry, the lane paint stripe geometry, the lane center geometry, or a different road feature. The selected B-Spline is then written in vector format as shown in Equation 3.

At block 204, the method 200 determines what dimensions to add to the B-Spline vector. A map customer may decide what dimensions to add. Accordingly, a map vendor may assign data to the B-Spline according to customer specific requirements. The following is a list of examples of potential customer specifications:
  Road center geometry+lane paint stripe geometry;
  Road center geometry+road center curvature;
  Lane paint stripe geometry+road center curvature;
  Road center geometry+elevation+slope+curvature+banking angle+road width; and
  Lane center geometry+lane elevation+lane slope+lane curvature+lane banking angle.
Of course, other dimensions and combinations of dimensions are possible.

At block 206, the method 200 determines how to create the selected dimensions so as to be compatible with the B-Spline vector created at block 202. The dimensions of a B-Spline may be created using curve fitting 208, merging B-Splines 210, and direct assignment of control point values 212. Other methods for creating compatible dimensions are also possible.

The choice of the method for creating one or more new dimensions depends on the nature of the data of the dimensions. For example, curve fitting may be used when the knot vector of the existing dimensions can also be used to compute the control point values of the new dimension. Merging may be used when dimensions are solved for independently (i.e., cannot be performed in a single curve fit). Direct assignment of control point values may be appropriate when known values along the road are associated with the existing dimensions of the spline. To ensure proper blending of assigned values (or no blending, such as the case with discrete value changes), the knot vector is designed to reflect the desired behavior.

At block 208, the method 200 uses curve fitting to create the selected dimensions. Curve fitting is the task of determining the optimal control point vector c and a knot vector t for the given input data vector. Various curve fitting techniques may be used, such as interpolation and approximation (e.g., Least Squares). The curve fitting techniques may also employ Calculus of Variations though regularization to stabilize the solution.

The knot vector is typically determined in a separate step prior to the curve fit and sometimes optimized afterwards. The knot vector determines the modeling flexibility of the spline curve. Therefore, it is beneficial for the knot vector to yield sufficient curve flexibility to enable the spline to properly model the underlying road shape or properties. Generally, the knot vector spacing can be made inversely proportional to curvature so that the spline has closely spaced knots where there is a lot of shape and fewer knots where the spline is straighter. Optimizing the knot vector includes reducing the overall number of knots so that the curve only has the required knots to model the geometry as well as positioning the knots in their optimal locations. Optimizing the knot vector may improve curve shape and reduce data storage.

At block 210, the method 200 creates the selected dimensions by merging B-Splines. Sometimes curve fitting is not possible or optimal to solve for all dimensions in a single curve fit. The data may not be available at the same time or may not be compatible to be solved in a single multi-dimensional curve fit operation. For example, the spline fit for the z-component of the road (i.e., altitude) requires a different knot vector and regularization than the (x, y) dimension of the road since altitude of the road varies more slowly than the 2D component of the road, and the data for the dimensions may have different characteristics, accuracy, and/or noise levels (e.g., shape points for 2D and GPS data for the altitude z dimension). In this scenario, merging B-Splines may be used to add dimensions to a B-Spline.

B-Splines have the property that if two or more B-Splines have identical knot vectors, their control point vectors can be merged, yielding a merged curve where the shape of the curve in each of the dimensions is preserved. Typically, when there are two B-Splines, such as a 2D lat/long (x, y) B-Spline and a 1D altitude (z) B-Spline, their knot vectors are different. The two knot vectors can be made identical by making them compatible. Making two knot vectors compatible is accomplished by inserting all the knots from one B-Spline into the other and vice versa.

The second consideration is ensuring that both curve fits have been parameterized according to the same metric, for example, according to a 2D arc length along the road. If the parameterization methods are different, the two parameter spaces may be misaligned even if the knot vectors are compatible. The most likely metric to be used for creating multi-dimensional ADAS splines are link geometry polyline length or 2D spline arc length. However, other metrics may be used.

Figure 3:
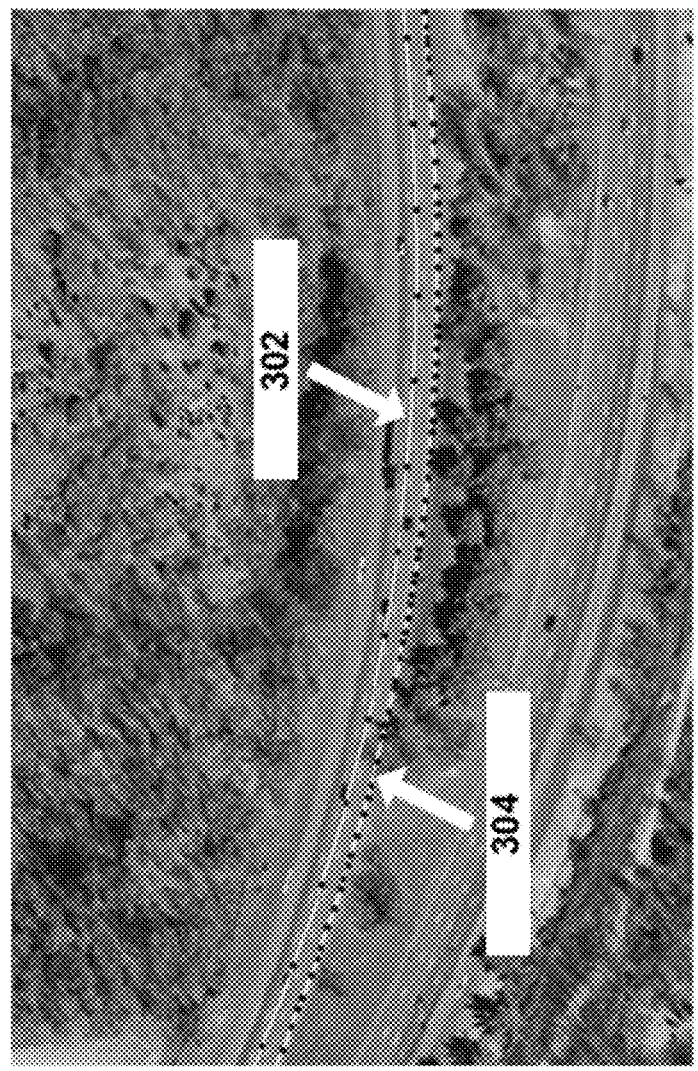
FIG. 3 depicts a road center B-Spline and a lane geometry B-Spline on a road, according to an example.
Figure 4:
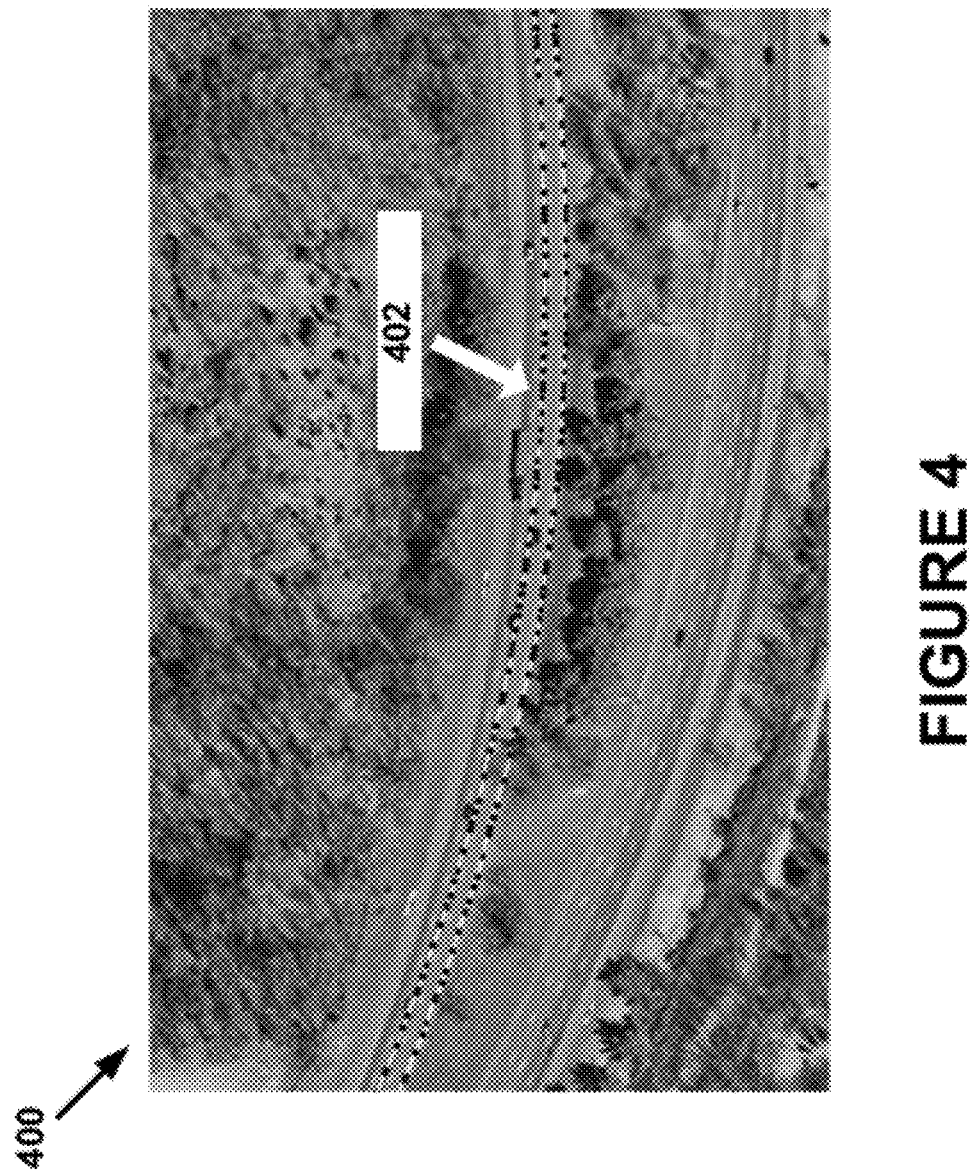
FIG. 4 depicts a multi-dimensional B-Spline on the road depicted in FIG. 3, according to an example.
Figure 5:
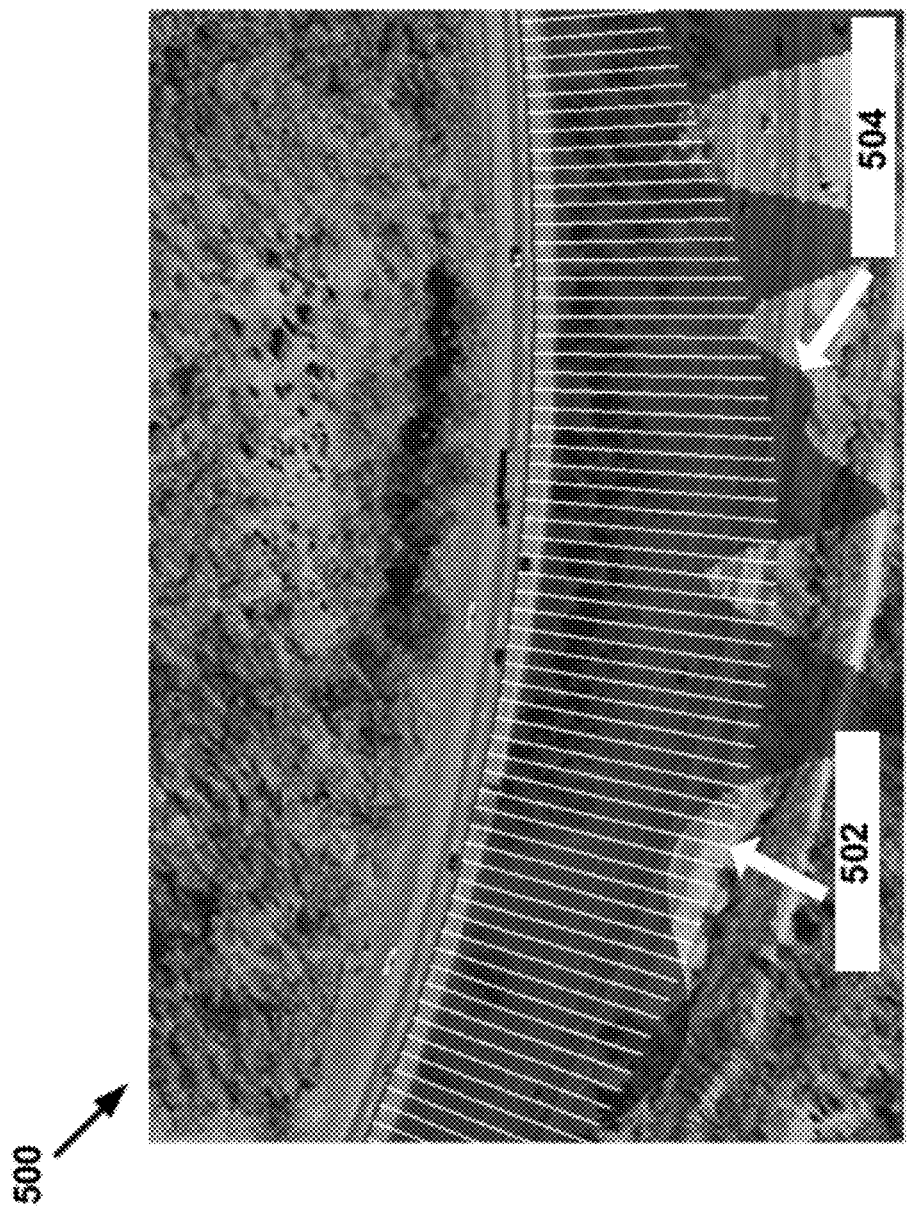
FIG. 5 depicts curvature of the road center and the lane geometry obtained from the multi-dimensional B-Spline depicted in FIG. 4, according to an example.

An example of merging B-Splines is provided with reference to FIGS. 3-5. FIG. 3 shows a section of the road 300 with two splines 302, 304. The road center geometry spline 302 and has few knots (dots) since it is smooth and has low precision in order exhibit ADAS quality curvature. The lane paint stripe geometry spline 304 has high precision, but is noisy and has inaccurate curvature. Only a single lane spline has been included in this example for simplicity, but all lane paint stripe (or lane center curves) for this road segment may been included in the single multi-dimensional spline.

In some cases, such as ramps, the road center geometry spline 302 does not provide correct curvature since it may not follow a typical vehicle path. In these cases, it may be necessary to include a separate curvature dimension. The curvature dimension is a continuous curve where the value is the road curvature (typically the road center curvature) along the spline curve.

In the example depicted in FIG. 3, the road center geometry spline 302 was obtained by fitting an ADAS spline to the link geometry, whereas the lane paint stripe geometry spline 304 was fitted to LIDAR points classified as paint stripe feature points. Since the two splines 302, 304 have different knot vectors, the splines 302, 304 cannot be immediately merged. Prior to merging, the method 200 modifies the knot vectors to become identical without changing the shape or continuity of either spline 302, 304. With identical knot vectors, the method 200 merges the control point vectors, yielding four-dimensional control points shown in Table 1.

TABLE 1

| Road Center LAT | Road Center LON | Lane Stripe LAT | Lane Stripe LON |
|---|---|---|---|
| ... | ... | ... | ... |
| 41.963153329970 | −87.746408376780 | 41.963116885511 | −87.746429822027 |
| 41.963165296220 | −87.746445403517 | 41.963128489889 | −87.746466324259 |
| 41.963189100282 | −87.746519529839 | 41.963151618198 | −87.746539350242 |
| 41.963221000522 | −87.746620129277 | 41.963182729720 | −87.746638330531 |
| 41.963244339131 | −87.746694521050 | 41.963205570988 | −87.746711486867 |
| 41.963267554765 | −87.746768983299 | 41.963228344740 | −87.746784725731 |
| ... | ... | ... | ... |

FIG. 4 shows a section of a road 400, which is the same as the section of the road 300 depicted in FIG. 3. However, instead of the road center geometry spline 302 and the lane paint stripe geometry spline 304, FIG. 4 depicts a multi-dimensional B-Spline curve 402. While the multi-dimensional B-Spline curve 402 looks like two spline curves 302, 304 when plotted, the curve 402 is plotted using only a single multi-dimensional B-Spline curve data representation. The compatible knot vector of the multi-dimensional B-Spline curve 402 is shown in FIG. 4 represented as dots. The knots line up between the two plotted dimensions as expected.

FIG. 5 shows a section of a road 500, which is the same as the section of the road 400 depicted in FIG. 4. However, in addition to the multi-dimensional B-Spline curve 402, FIG. 5 depicts curvature to illustrate the shape difference between the road center and lane paint stripe geometry. As seen in FIG. 5, the curvature of the road center dimension 502 (illustrated by the white porcupine vector profile) is much smoother than the curvature of the lane paint stripe dimension 504 (illustrated by the dark gray profile).

At block 212, the method 200 uses direct assignment to create the selected dimensions. A discontinuous spline is a spline that represents discontinuous values (in at least one dimension) along the road, such as modeling the number of lanes along the link. Looking at Equation 3 through Equation 5, it may seem that adding dimensions to the B-Spline is as simple as adding another dimension to the control point vector, but this is only possible when the two splines are compatible. Direct assignment of discrete control point values is performed using a technique known as knot insertion. Knot insertion is the task of inserting a new (or additional) knot for a specific u-parameter value.

As for curve fitting, each data point needs to be associated with the corresponding u-parameter that designates where along the spline the data value is allocated. Since in this example the new dimension contains discontinuous values, the data value needs to perform "discontinuous jumps" along the spline in that dimension. To handle discontinuous jumps, the method 200 inserts repeatable knot values into the knot vector to break up the curve for the new dimension at those locations. The existing 3D spatial dimensions maintain their continuity (e.g., position, curvature, and heading continuity). The method 200 then assigns the desired vector component and value (e.g., the number of lanes) to the control point vector at the inserted knot locations. For as long as this value is maintained, the method 200 also assigns it to existing control points until the value changes (e.g., the number of lanes changes).

Figure 6:
FIG. 6 depicts a road center spline curve, according to an example.

An example of encoding distinct values, such as number of lanes, discrete road grade values, and speed limits, to an existing spline is explained with reference to FIGS. 6-7. FIG. 6 depicts a section of a road 600 and a road center geometry B-Spline 602 having two dimensions (latitude and longitude) along with its knot vector represented by dots. In this example, the number of lanes will be associated with the B-Spline 602.

The B-Spline 602 is parameterized from left to right and, at 152 meters from the beginning of the spline, the number of lanes changes from 4 to 5. The method 200 inserts knots to encode the location where the number of lanes changes. To add distinct values to the spline 602, a knot-multiplicity of four is used since the spline 602 is a cubic non-uniform B-Spline. The necessary knot multiplicity allows the spline to become discontinuous in the new dimension so the value can instantaneously change from 4 to 5 at that location.

Figure 7:
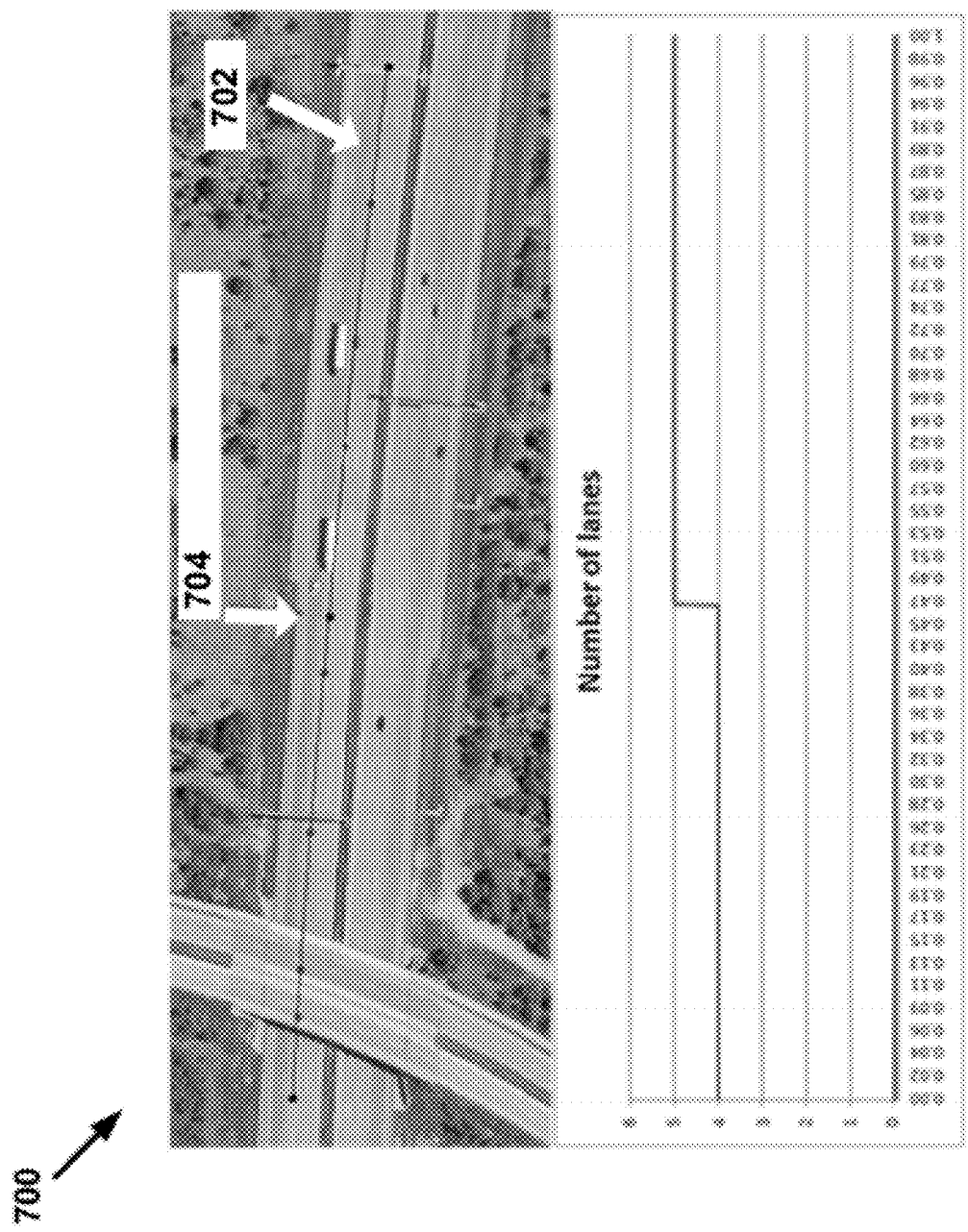
FIG. 7 depicts knot insertion to encode where the number of lanes changes on the road center spline curve depicted in FIG. 6, according to an example.

FIG. 7 shows a section of a road 700, which is the same as the section of the road 600 depicted in FIG. 6. In FIG. 7, the "number-of-lanes" dimension is plotted below the picture. After performing the knot insertion, the method 200 assigns the appropriate number of lanes to each control point, yielding the new three-dimensional control points shown in Table 2.

TABLE 2

| Road Center LAT | Road Center LON | Number of Lanes |
|---|---|---|
| ... | ... | ... |
| 48.228783431522544 | 11.599023995263620 | 4 |
| 48.228778808887409 | 11.599100811815624 | 4 |
| 48.228778808887490 | 11.599100811815624 | 5 |
| 48.228764172398364 | 11.599344033401415 | 5 |
| ... | ... | ... |

Table 3 shows the repeated knot values in the knot vector that designates the location along the B-Spline where the number of lanes changes.

TABLE 3

| Road Center LAT |
|---|
| ... |
| 0.4125970734649 |
| 0.4651996571428 |
| 0.4651996571428 |
| 0.4651996571428 |
| 0.4651996571428 |
| 0.6317533943907 |
| ... |

To add additional number of lane change locations along the B-Spline, the method 200 repeats this procedure the desired number of times.

At block 214, the method 200 adds the created dimensions to the B-Spline vector created at block 202. Examples of added dimensions are shown in Equations 4 and 5. The number of dimensions added to the B-Spline vector is not limited, and the process of creating and adding dimensions is repeated as necessary for all of the selected dimensions.

At block 216, the method 200 stores the B-Spline with added dimensions in a database. The database may be a geographic database accessible by a navigation system or other system located within a vehicle. The database is stored on a memory storage device, such as a memory chip, a hard drive, or a DVD. Prior to storage, the data representation can be compressed to reduce storage space. For example, lossless wavelet compression techniques may be used.

The database may be used by a navigation system or other system within a vehicle. When the system needs map data to provide map-related functions, the system requests the map data from the database. In response to the request, the system receives B-Spline vector representations. The system can retrieve all of the road dimensions encoded in the vector in a single operation for any point along the road. This operation is further explained with an example described with reference to FIG. 8.

Figure 8:
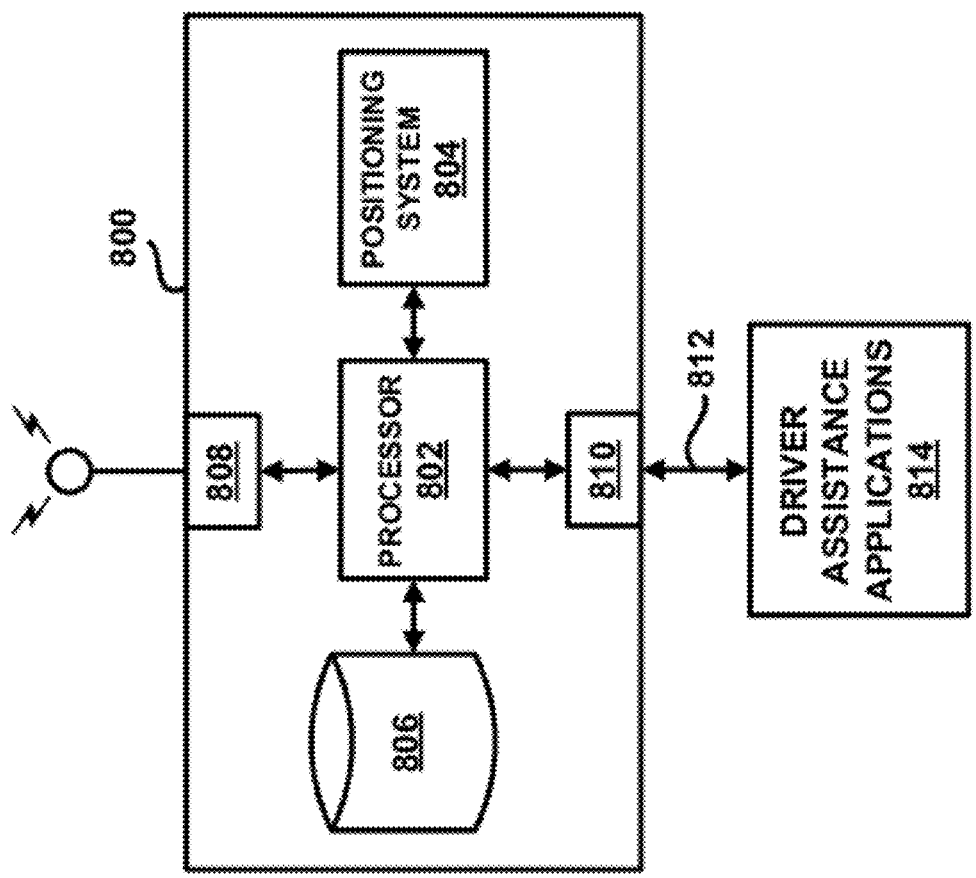
FIG. 8 is a block diagram of a system for using map data that represents roads with a single B-Spline curve.

FIG. 8 is a block diagram of a system 800 that uses map data representing roads with a single B-Spline curve. In this example, the system is a map and positioning engine (MPE) 800; however, other systems may use the single curve data representation. The MPE 800 enables map-enhanced ADAS in vehicles that do not have an in-vehicle navigation system. The MPE 800 includes a processor 802, a positioning system 804, data storage 806, a communication system 808, and an in-vehicle data bus interface 810. The MPE 800 may also include other hardware, software, and/or firmware.

The processor 802 may be any type of processor, controller, or other computing device. For example, the processor 802 may be a digital signal processor. The processor 802 receives inputs from the positioning system 804, the data storage 806, the communication system 808, the in-vehicle data bus interface 810, and other sources. The processor 802 then processes the inputs using application software programs, such as a map access application, a map update application, a vehicle positioning application, and an electronic horizon application.

The processor 802 then provides outputs to driver assistance applications 814 via the in-vehicle data bus interface 810 and a data bus 812. Preferably, the in-vehicle data bus interface 810 and the data bus 812 are a Controller-Area Network (CAN) interface and a CAN-bus, which are designed for automotive applications. The driver assistance applications 814 may include adaptive headlight aiming, adaptive cruise control, obstruction detection, obstruction avoidance, collision avoidance, adaptive shift control, and others.

The positioning system 804 may utilize GPS-type technology, a dead reckoning-type system, or combinations of these or other systems, all of which are known in the art. The positioning system 804 may also include suitable sensing devices that measure the traveling distance speed, direction, orientation, and so on. For example, the positioning system 804 may include a GPS system and a gyroscope. The positioning system 804 provides an output signal to the processor 802. Some of the application software programs that run on the processor 802 use the output signal from the positioning system 804 to determine the location, direction, orientation, etc., of the MPE 800.

The geographic database 806 is designed for ADAS applications. Like a navigation system geographic database, the geographic database 806 contains data about roads and intersections in a geographic region. For example, the geographic database 806 contains at least one database record (also referred to as "entity" or "entry") for each road segment (also referred to as a link). The road segment data record includes a single B-Spline vector representation of the physical road segment.

If the processor 802 receives a request for map data from one of the driver assistance applications 814, the processor 802 sends a request to the map access application to obtain the map data. The map access application locates data responsive to the request on the physical storage media 806 and with a single read operation obtains the multi-dimensional spline representation. The map access application then provides the multi-dimensional spline representation to the processor 802, which then provides one or more of the encoded road dimensions to the requesting driver assistance application 814.

Because a single B-Spline curve can represent multiple road properties, each road segment can be represented with a single data entity in a geographic database, which greatly simplifies the road segment data model. Additionally, this B-Spline vector representation can be easily modified for different map users' needs. The storage requirements for the geographic database can be further reduced using lossless wavelet compression techniques. Moreover, the B-Spline vector representation allows for computation of curve properties, such as intrinsic curve properties of each of the curve dimensions for any given parametric value along the road, and for queries of such spline properties by distance ahead of a map matched vehicle location.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer-implemented method for representing multiple road dimensions with a single multi-dimensional parametric spline curve, comprising in combination:
creating, by a controller, a first spline vector to represent an initial dimension of a road segment;
identifying at least one additional dimension of the road segment to add to the first spline vector;
identifying a process for creating the at least one additional road dimension so that the at least one additional dimension is compatible with the first spline vector;
executing, by the controller, the identified process to modify a second spline vector associated with the at least one additional road dimension;
adding the second spline vector associated with the at least one additional road dimension to the first spline vector as a combined spline vector; and
storing the combined spline vector including the initial dimension of the road segment and the second spline vector associated with the at least one additional road dimensions in a database.

2. The method of claim 1, wherein the combined spline vector represents a B-Spline curve.

3. The method of claim 2, wherein the B-spline curve comprises at least one control point and at least one knot vector.

4. The method of claim 1, wherein the initial road dimension is road center geometry.

5. The method of claim 4, wherein the at least one additional road dimension is selected from the group consisting of lane paint stripe geometry, road center curvature, elevation, slope, curvature, banking angle, road width, lane center geometry, lane elevation, lane slope, lane curvature, and lane banking angle.

6. The method of claim 1, wherein the initial road dimension is selected from the group consisting of road center geometry, lane paint stripe geometry, road center curvature, elevation, slope, curvature, banking angle, road width, lane center geometry, lane elevation, lane slope, lane curvature, and lane banking angle.

7. The method of claim 1, wherein the at least one additional road dimension is a discrete road property.

8. The method of claim 1, wherein the at least one additional dimension is an analytical road property.

9. The method of claim 1, wherein the process to create the at least one additional road dimension is curve fitting.

10. The method of claim 1, wherein the process to create the at least one additional road dimension is merging splines.

11. The method of claim 1, wherein the process to create the at least one additional road dimension is direct assignment.

12. The method of claim 1, wherein the second spline vector associated with the at least one additional road dimension is a knot vector that defines joint locations of the parametric spline curve with respect to the at least one additional road dimension.

13. A system that uses a single multi-dimensional spline curve for representing multiple road dimensions, comprising:
- a data storage device configured to include data representing roads in a geographic area, wherein at least one of the roads is represented with a single multi-dimensional spline curve, wherein the single multi-dimensional spline curve is formed from merging a location spline curve and a road property spline curve through insertion of at least one knot point from the location spline curve into the road property spline curve and insertion of at least one knot point from the road property spline curve into the location spline curve; and
- a processor configured to receive a request for map data from a requestor, obtain the single multi-dimensional spline curve from the data storage device, and provide at least one road dimension encoded in the single multi-dimensional spline curve to the requester.

14. The system of claim 13, wherein the data representing roads is compressed using a lossless wavelet compression technique.

15. The system of claim 13, wherein the single multi-dimensional spline curve is stored in the data storage device in vector format.

16. The system of claim 13, wherein the at least one road dimension has a continuous value.

17. The system of claim 13, wherein the at least one road dimension has a discontinuous value.

18. The system of claim 13, wherein the requester is a driver assistance application.

19. The system of claim 13, wherein the processor is configured to modify a knot vector of at least one of the location spline curve or the road property spline curve to be compatible with a knot vector of the other of the location spline curve or the road property spline curve.

20. A non-transitory computer-readable medium having instructions that when executed are configured to cause a processor to:
- generate a vector representation of a single road spline that encodes multiple road properties, wherein an initial road property is added to the vector representation;
- access additional road properties in continuous value in a road properties spline;
- modify the road properties spline to be compatible with the single road spline; and
- incorporate the road properties spline into the vector representation of the single road spline.

21. The non-transitory computer-readable medium of claim 20, wherein the data storage device is located within a vehicle and a system within the vehicle accesses data stored in the data storage device.

* * * * *